United States Patent
Blumer

(10) Patent No.: US 11,114,847 B1
(45) Date of Patent: Sep. 7, 2021

(54) HIGH SPEED DATA TRANSIENT PROTECTION

(71) Applicant: Rockwell Collins, Inc., Cedar Rapids, IA (US)

(72) Inventor: Lawrence M. Blumer, Indianola, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 767 days.

(21) Appl. No.: 15/920,125

(22) Filed: Mar. 13, 2018

(51) Int. Cl.
*H02H 9/00* (2006.01)
*H02H 9/04* (2006.01)
*H04B 3/04* (2006.01)

(52) U.S. Cl.
CPC .............. *H02H 9/045* (2013.01); *H04B 3/04* (2013.01)

(58) Field of Classification Search
None
See application file for complete search history.

(56) References Cited

U.S. PATENT DOCUMENTS

| | | | | |
|---|---|---|---|---|
| 4,947,386 | A | * | 8/1990 | Preschutti ................ H04B 3/38 333/16 |
| 5,940,442 | A | * | 8/1999 | Wong .................... H04L 25/062 375/232 |
| 6,474,164 | B1 | * | 11/2002 | Mucciardi .............. G01N 29/36 73/602 |
| 2002/0067222 | A1 | * | 6/2002 | Tang .................... H01R 24/547 333/109 |
| 2017/0295043 | A1 | * | 10/2017 | Abernathy ........ H04L 25/03885 |

* cited by examiner

*Primary Examiner* — Stephen W Jackson
(74) *Attorney, Agent, or Firm* — Suiter Swantz pc llo

(57) ABSTRACT

A high bandwidth data interface in an aircraft includes a pulse tolerant, non-inductive resistor for reducing surge current due to lightning transients, and a very low capacitance transient voltage suppressor to suppress the lightning transient voltages. A cable equalizer/redriver then recovers the original high bandwidth input signal. The high bandwidth interface is thereby able to survive DO-160 section 22 level 3 and 4 lightning transients.

16 Claims, 3 Drawing Sheets

HIGH SPEED DATA TRANSIENT PROTECTION

BACKGROUND

High bandwidth data interfaces in aircraft, such as those operating in the gigahertz range, are subject to lightning transients. Existing solutions for ameliorating the effect of lighting transients, including high capacitance transient voltage suppressors, tend to result in an attenuated signal due to the impedance of the transient voltage suppressor, its location, and board trace impedance.

Consequently, it would be advantageous if an apparatus existed that is suitable for removing lightning transients from a high bandwidth data path without compromising the signal.

SUMMARY

In one aspect, embodiments of the inventive concepts disclosed herein are directed to a circuit incorporated into a high bandwidth data path including a transient voltage suppressor and a cable equalizer. In a further aspect, the circuit also includes a non-inductive resistor.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
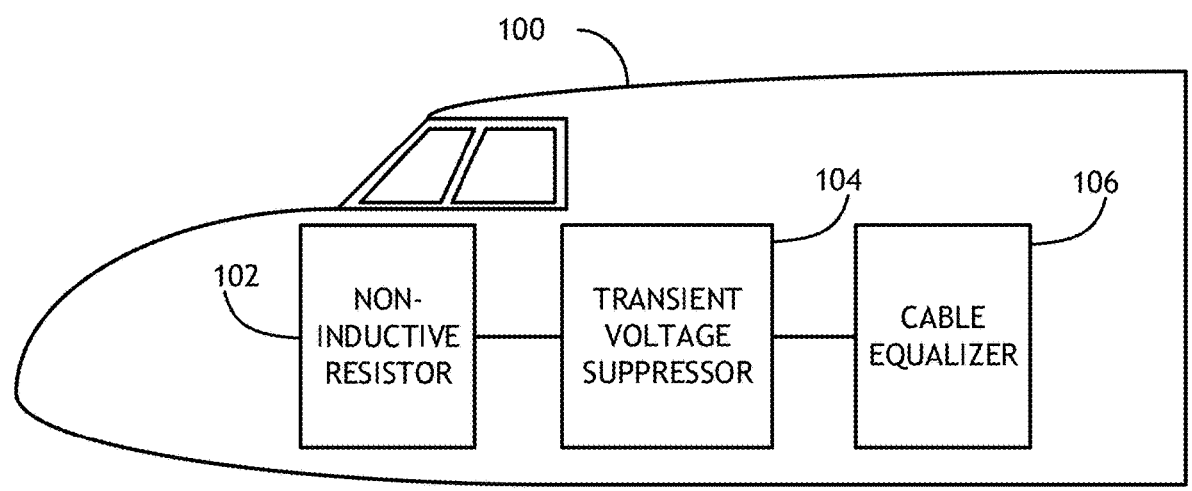
FIG. 1 shows an environmental view of an aircraft according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for suppressing lightning transients in a high bandwidth system.

Referring to FIG. 1, an environmental view of an aircraft 100 according to an exemplary embodiment of the inventive concepts disclosed herein is shown. The aircraft 100 includes a high bandwidth lightning transient filter for removing lightning transients from a high bandwidth signal comprising a non-inductive resistor element 102, a transient voltage suppressor 104, and a cable equalizer 106.

In at least one embodiment, the non-inductive resistor element 102 is a pulse tolerant non-inductive resistor for reducing surge current. In at least one embodiment, the transient voltage suppressor 104 is a very low capacitance transient voltage suppressor for suppressing lightning transients. In at least one embodiment, the cable equalizer 106 is a cable equalizer/redriver for recovering the input signal and sending the recovered input signal to a receiving device.

In a high bandwidth data path, such as SMPTE-292, HDMI, DVI, Displayport, etc., signals pass through the non-inductive resistor 102 and transient voltage suppressor 104 to remove voltage transients caused by lightning. The resulting filtered signal is then boosted via the cable equalizer 106.

Figure 2:
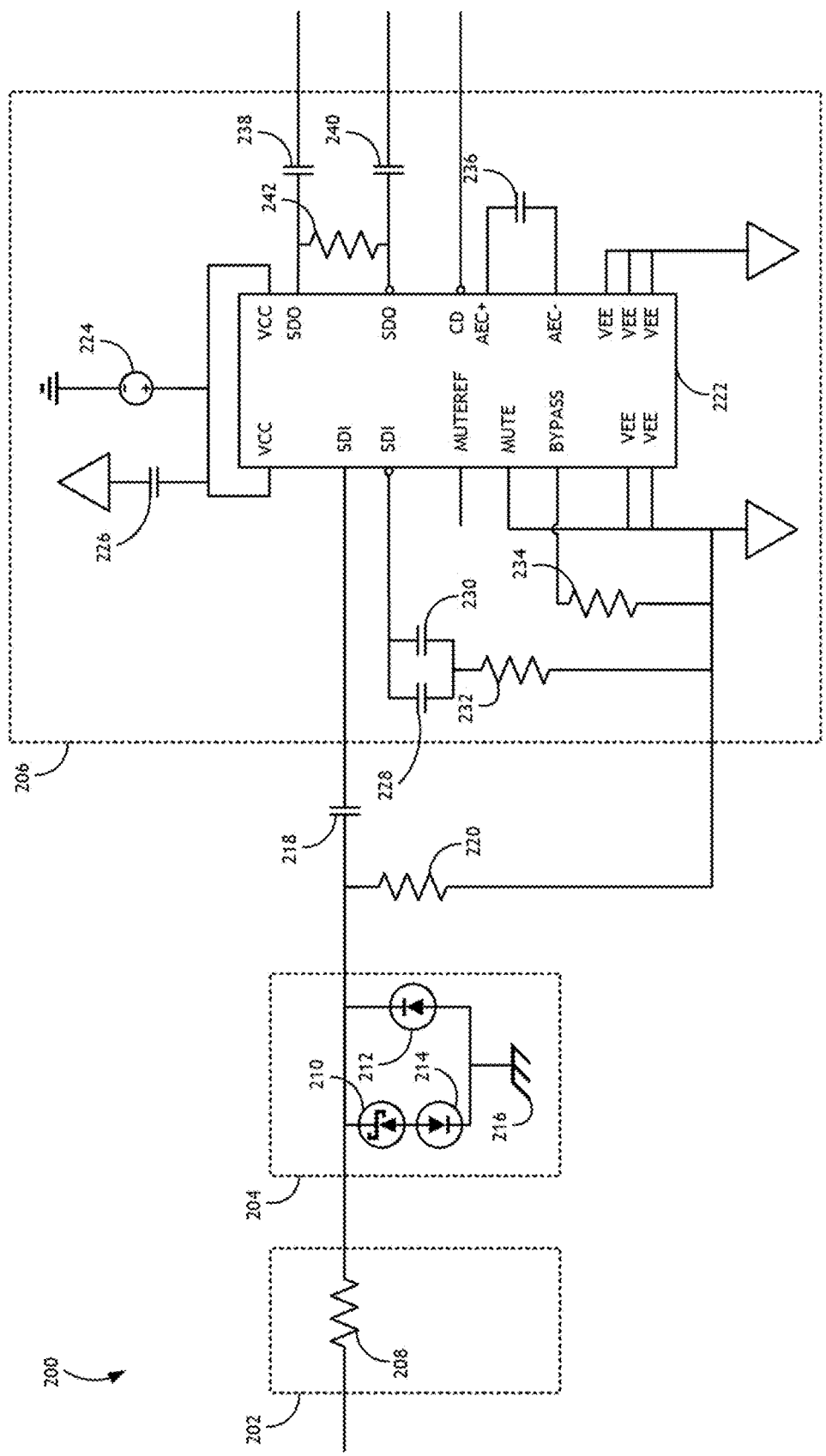
FIG. 2 shows a block diagram of a circuit according to an exemplary embodiment of the inventive concepts disclosed herein.

Referring to FIG. 2, a block diagram of a circuit 200 according to an exemplary embodiment of the inventive concepts disclosed herein is shown. In a high bandwidth data path, a non-inductive resistor element 202 receives a high bandwidth signal. The non-inductive resistor element 202 may comprise a pulse tolerant resistor 208. The pulse tolerant non-inductive resistor 208 reduces surge current from lightning transients in the data path. In at least one embodiment, the resistor 208 is approximately 75 ohms.

Signals from the non-inductive resistor element 202 pass through a transient voltage suppressor 204. In at least one embodiment, the voltage transient suppressor 204 comprises three diodes 210, 212, 214 organized in a unidirectional configuration with a cathode of a first diode 210 (such as a Zener diode) and a cathode of a second diode 212 connected to the data path, the anode of the second diode 212 and the cathode of a third diode 214 connected to ground 216 (such as a chassis), and the anodes of the first diode 210 and third diode 214 connected together. The diodes 210, 212, 214 may comprise an Ultra-Low Capacitance Transient Voltage Suppressor (such as, for example, a ProTek Devices GBLC03).

Signals passing through the transient voltage suppressor 204 are received by a cable equalizer 206 via a first capacitor 218 and a first grounded resistor 220. In at least one embodiment, the first capacitor is approximately a 1 µF capacitor. Likewise, the first grounded resistor 220 may be an approximately 75 ohm resistor connected to a signal ground.

In at least one embodiment, the cable equalizer 206 comprises an adaptive cable equalizer 222 (such as, for example, a Texas Instrument LMH0344) and corresponding circuitry. In at least one embodiment, the first capacitor 218 is connected to a serial data input (SDI) pin of the adaptive cable equalizer 222. A voltage supply 224 is connected to the positive power supply (VCC) pins of the adaptive cable equalizer 222, with second capacitor 226 connecting the voltage source 224 to the signal ground. In at least one embodiment, the voltage source 224 is an approximately 3.3 direct current voltage source and the second capacitor 226 is an approximately 0.1 µF capacitor.

In at least one embodiment, a complimentary SDI pin of the adaptive cable equalizer 222 is connected to a third capacitor 228 and a fourth capacitor 230 connected together in parallel, and connected to a second grounded resistor 232. In at least one embodiment, the third capacitor 228 is an approximately 1 µF capacitor while the fourth capacitor 230 is an approximately 0.001 µF capacitor. Likewise, the second grounded resistor 232 is an approximately 37.4 ohm resistor.

In at least one embodiment, a Mute pin of the adaptive cable equalizer 222 is grounded to force a signal output. In at least one embodiment, a Mute$_{ref}$ pin of the adaptive cable equalizer 222 may be unconnected or grounded. In at least one embodiment, a Bypass pin of the adaptive cable equalizer 222 is connected to a grounded pull down resistor 234. The grounded pull down resistor 234 may be an approximately 49.9 ohm resistor. In at least one embodiment, the negative power supply pins (VEE) of the adaptive cable equalizer 222 are grounded.

In at least one embodiment, a fifth capacitor 236 is connected to the positive and negative AEC loop filter pins of the adaptive cable equalizer 222. In at least one embodiment, the fifth capacitor 236 is an approximately 1 µF capacitor.

In at least one embodiment, a sixth capacitor 238 is connected to a serial data output (SDO) pin of the adaptive cable equalizer 222 and a seventh capacitor 240 is connected a complementary SDO pin of the adaptive cable equalizer 222. An output resistor 242 may be interposed between the sixth capacitor 238 and seventh capacitor 240. In at least one embodiment, the sixth capacitor 238 and seventh capacitor 240 may be approximately 4.7 µF capacitors, and the output resistor 242 may be an approximately 100 ohm resistor.

Utilizing such a circuit 200 in a high bandwidth data path, lightning transients in the data path are removed and a filtered signal is produced at the cable equalizer 206.

Figure 3:
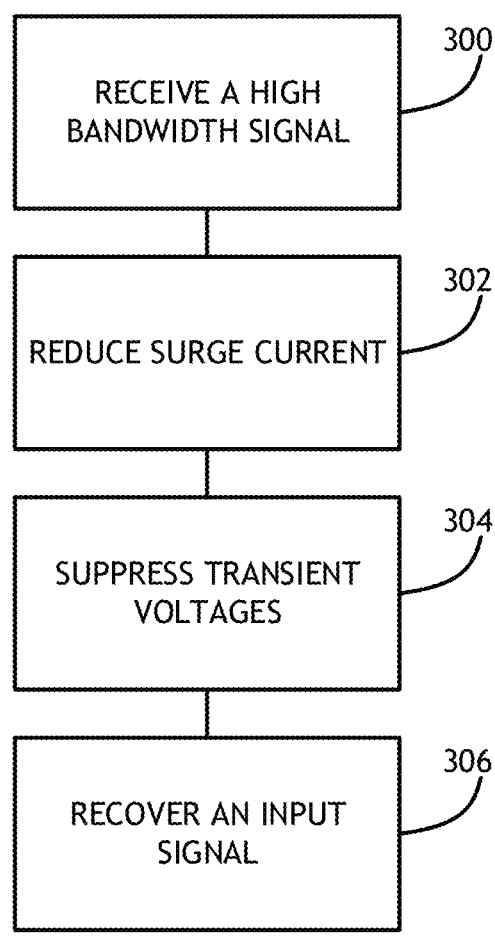
FIG. 3 shows a flowchart of a method for filtering transient voltages according to the inventive concepts disclosed herein.

Referring to FIG. 3, a flowchart of a method for filtering transient voltages according to the inventive concepts disclosed herein is shown. In at least one embodiment, a transient suppressor system receives 300 a high bandwidth signal and reduces 302 surge currents due to lightning transients. Transient voltages are then suppressed 304 and the high bandwidth signal is recovered 306.

High speed video and data interfaces subject to lightning transients such as onboard the F-35, Airbus Helo, and T-X trainer are able to remove such transients while preserving data integrity. System including embodiments of the present disclosure may pass DO-160 level 3 bulk cable pin injection requirements.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A transient voltage suppression circuit comprising:
an ultra-low capacitance transient voltage suppressor; and
a cable equalizer in electronic communication with the transient voltage suppressor,
wherein:
the transient voltage suppressor is configured to remove lightning transients from a signal having at least one gigahertz bandwidth; and
the cable equalizer is configured to boost a filtered signal from the transient voltage suppressor.

2. The circuit of claim 1, further comprising a resistor in electronic communication with the transient voltage suppressor.

3. The circuit of claim 2, wherein the resistor comprises a pulse tolerant non-inductive resistor of between 70 and 80 ohms.

4. The circuit of claim 1, wherein the transient voltage suppressor is connected to the cable equalizer via a capacitor interposed between the transient voltage suppressor and a serial data input of the cable equalizer.

5. The circuit of claim 1, wherein the cable equalizer comprises a pair of parallel capacitors connected to a complimentary serial data input of the cable equalizer.

6. The circuit of claim 1, wherein the cable equalizer comprises a serial data output and a complimentary serial data output, each of the serial data output and complimentary serial data output connected to a corresponding output capacitor, and an output resistor interposed between the serial data output and complimentary serial data output.

7. A computer system including a transient voltage suppression circuit comprising:
a resistor;

a transient voltage suppressor in electronic communication with the resistor; and a cable equalizer in electronic communication with the transient voltage suppressor via a capacitor interposed between the transient voltage suppressor and a serial data input of the cable equalizer, wherein:

the transient voltage suppressor is configured to remove lightning transients from a signal having at least one gigahertz bandwidth; and the cable equalizer is configured to boost a filtered signal from the transient voltage suppressor.

8. The computer system of claim 7, wherein the resistor comprises a pulse tolerant non-inductive resistor of between 70 and 80 ohms.

9. The computer system of claim 7, wherein the transient voltage suppressor comprises an ultra-low capacitance transient voltage suppressor.

10. The computer system of claim 7, wherein the cable equalizer comprises a pair of parallel capacitors connected to a complimentary serial data input of the cable equalizer, a first capacitor in the pair of parallel capacitors comprising an approximately 1 µF capacitor and a second capacitor in the pair of parallel capacitors comprising a 0.001 µF capacitor.

11. The computer system of claim 7, wherein the cable equalizer comprises a serial data output and a complimentary serial data output, each of the serial data output and complimentary serial data output connected to a corresponding output capacitor of between 4 µF and 5 µF, and an output resistor of between 90 and 110 ohms interposed between the serial data output and complimentary serial data output.

12. An aircraft comprising:

a transient voltage suppression circuit comprising:

a transient voltage suppressor;

a pulse tolerant non-inductive resistor of between 70 and 80 ohms in electronic communication with the transient voltage suppressor; and a cable equalizer in electronic communication with the transient voltage suppressor, wherein:

the transient voltage suppressor is configured to remove lightning transients from a signal having at least one gigahertz bandwidth; and the cable equalizer is configured to boost a filtered signal from the transient voltage suppressor.

13. The aircraft of claim 12, wherein the transient voltage suppressor comprises an ultra-low capacitance transient voltage suppressor.

14. The aircraft of claim 12, wherein the transient voltage suppressor is connected to the cable equalizer via a capacitor interposed between the transient voltage suppressor and a serial data input of the cable equalizer.

15. The aircraft of claim 12, wherein the cable equalizer comprises a pair of parallel capacitors connected to a complimentary serial data input of the cable equalizer.

16. The aircraft of claim 12, wherein the cable equalizer comprises a serial data output and a complimentary serial data output, each of the serial data output and complimentary serial data output connected to a corresponding output capacitor, and an output resistor interposed between the serial data output and complimentary serial data output.

* * * * *